US008505953B2

(12) United States Patent
Marek

(10) Patent No.: US 8,505,953 B2
(45) Date of Patent: Aug. 13, 2013

(54) COMBINATION TOOL

(76) Inventor: Rick Marek, El Campo, TX (US)

( * ) Notice: Subject to any disclaimer, the term of this patent is extended or adjusted under 35 U.S.C. 154(b) by 323 days.

(21) Appl. No.: 12/802,176

(22) Filed: Jun. 1, 2010

(65) Prior Publication Data
US 2011/0289692 A1    Dec. 1, 2011

(51) Int. Cl.
*E04H 17/26* (2006.01)
*B60D 1/24* (2006.01)
*B25F 1/00* (2006.01)
*B23P 11/00* (2006.01)

(52) U.S. Cl.
USPC .......................................... 280/504; 296/1.07

(58) Field of Classification Search
USPC ................... 280/504, 515; 173/162.1, 162.2, 173/213, 118, 90, 91; 301/312, 340, 381
See application file for complete search history.

(56) References Cited

U.S. PATENT DOCUMENTS

| 3,712,389 A | 1/1973 | Smoak |
| 3,856,092 A | 12/1974 | Mann |
| 7,185,904 B1 | 3/2007 | Jones et al. |
| 7,306,275 B2 * | 12/2007 | Kalous .......................... 296/1.07 |
| 2004/0160034 A1 * | 8/2004 | Mitchell ........................ 280/163 |

* cited by examiner

*Primary Examiner* — Tony Winner
*Assistant Examiner* — Jacob Knutson
(74) *Attorney, Agent, or Firm* — The Matthews Firm

(57) ABSTRACT

A combination tool usable to couple between land vehicles or other objects is described, that is also usable to impact posts, such when constructing a fence. The combination tool can include a main body with a first end configured to impact a post, and a second end configured for coupling to a vehicle or other object. A restrainer pin detachably connected to the main body is usable to secure the combination tool to the object. The restrainer pin can also be used to engage a fence clip or similar flexible member, such as when constructing a fence. Additionally, the combination tool can include a ball hitch or similar protrusion for engagement with a tow vehicle or other object, and a platform or similar member for facilitating a user's access to the vehicles or other objects to which the combination tool is secured.

13 Claims, 7 Drawing Sheets

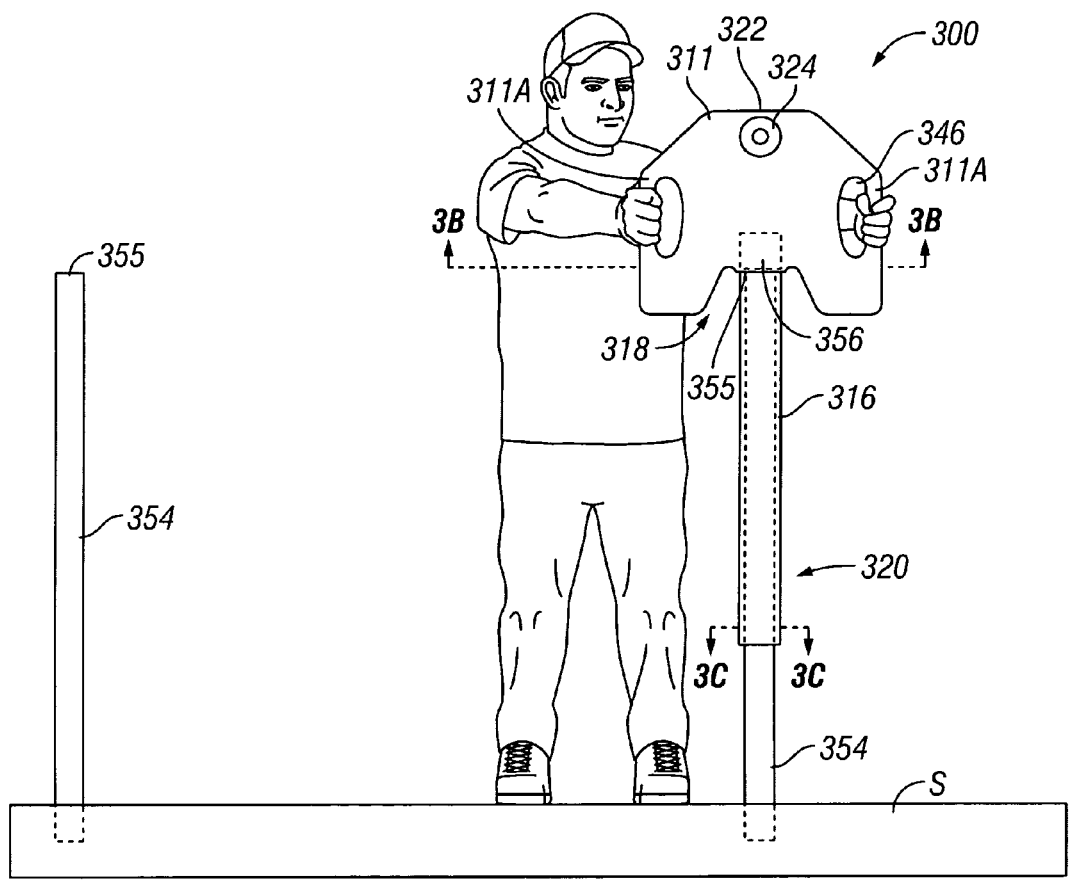
FIG. 3A
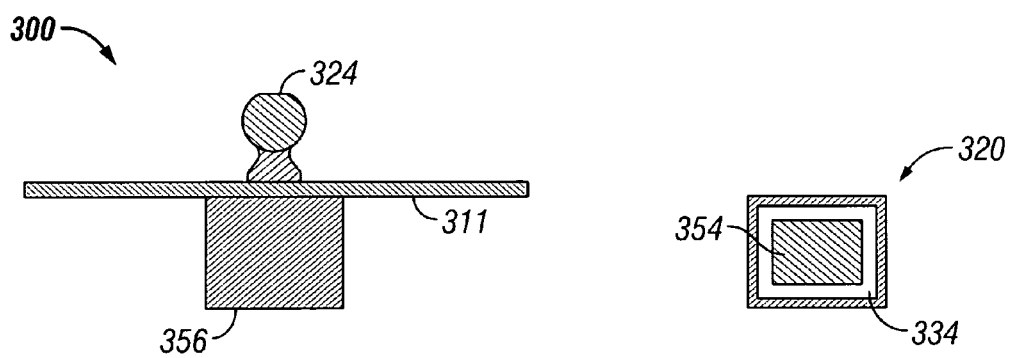
FIG. 3B  FIG. 3C

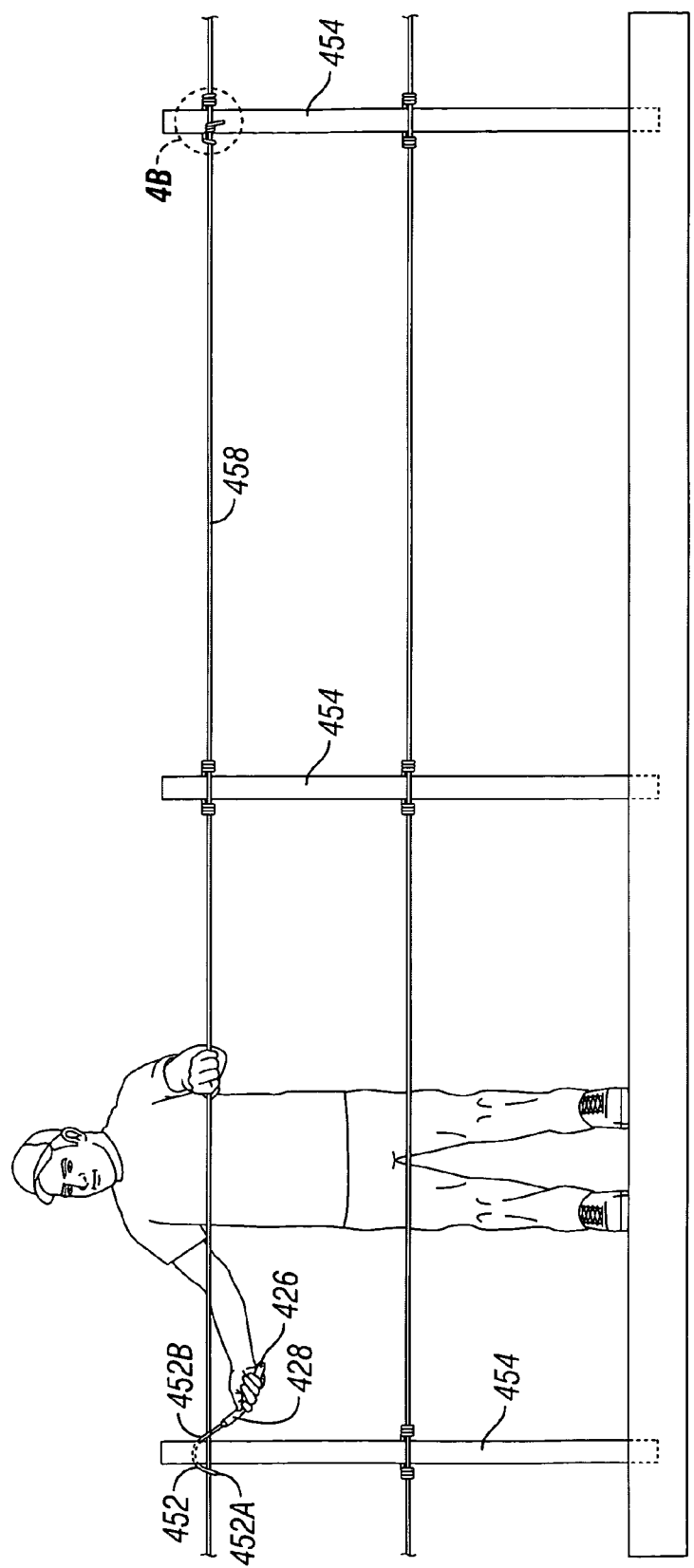

COMBINATION TOOL

BACKGROUND OF THE DISCLOSURE

1. Field of the Disclosure

The present disclosure relates to a versatile, multifunctional combination tool usable for coupling movable objects together and building barriers, and methods for using the same. Embodiments disclosed herein relate generally to an improved hitch, and more specifically to a portable trailer hitch usable to couple two land vehicles to each other. Other embodiments relate to a combination tool that may be used to drive posts into the ground, and couple clips and/or wires thereto to form a fence. A specific embodiment relates to a portion of the combination tool usable to wrap a flexible member around a post.

2. Description of the Related Art

Conventional trailer hitch assemblies are known in the art, and are typically used to connect a heavy load-bearing vehicle to a towable device, such as a trailer. As it has become more common for consumers to utilize standard passenger trucks (e.g., pickups, vans, SUV's, recreational vehicles, automobiles, etc.) to haul oversized movable objects, such as a boat trailer, animal trailer, etc., it has also become common to use trailer hitch assemblies to accommodate these endeavors.

The height of a truck and/or trailer often impedes a user's ability to see over and/or walk around the object. It may be important to see into the movable object, for example, to ensure that all necessary materials are stored within and/or that the coupling between objects is secure, etc. Users may often attempt to step and/or stand on the trailer hitch or other coupling, which may not be designed or intended to support a user's weight, which can cause damage to the hitch, decoupling of the two vehicles, and/or injury to the user. Some situations are especially hazardous, such as when launching or recovering a watercraft, or during inclement weather, where surfaces are often wet and/or the vehicle and trailer are parked on an inclined ramp surface. Even with the knowledge of hazardous conditions, the impediment of vision into or over a truck and/or trailer provides a temptation to step on and/or over the hitch.

Additionally, trucks, tow vehicles, or other similar vehicles, are often used to haul heavy loads, trailers, etc. to a jobsite. For example, a trailer may include tools and materials used to build a barrier (e.g., partition, fence, etc.) at an industrial location, or to build a barrier to corral and maintain livestock in a desired location. These tools and materials often include expensive, easily stolen items, such as, post drivers, fence posts, wire stretchers, fence clips, fence clip tools, and similar objects.

Some barriers, such as wire fences, can be formed using fence posts, between which one or more strands of barbed wire can may strung. One specific example of a post is a metal t-type fence post, commonly referred to as a "t-post." To erect such a fence, a post driver or similar object is used to impact and/or drive one or more posts into the ground. Because some job sites are remote or difficult to reach, portable post drivers are highly desired.

Once the posts have been installed, t-post clips or similar flexible members may then be used to secure wire to the t-post to create a fence, as known in the art. T-post clips may generally include short pieces of flexible or semi-flexible wire that may have ends that are hook-shaped, curved, etc. Once the clip is initially positioned on the post, the clip may be moved (i.e., manipulated, worked, bent, twisted, deformed, etc.) to attach or retain the wire to the fence post. This may include, for example, installing the t-clip by grasping an end with a clip tool and twisting the hook end around the fence wire to firmly wrap clip with the fence wire. Similar undertakings are also usable to remove a clip from the t-post.

The use of conventional tools to tightly and securely fasten clips to fence posts requires considerable effort. This is particularly true when deforming both ends of mounting clips or similar flexible members. Some existing clip bending tools address various needs in the art, but these designs are difficult and cumbersome to use, or require positioning of the tool at odd angles that provide difficulty when attempting to properly install a clip. Moreover, a user will often wear protective gear, such as bulky gloves, that hinders handling of the tool.

Thus, there is a need for a combination tool that addresses multiple shortcomings of the prior art. It may readily be appreciated that there exists a continuing need for a new and improved post driver that may be used for driving or setting posts into the ground in a faster, more convenient manner, while facilitating the portability and security of the tool.

There also exists a need for a trailer hitch that allows a user to step over or on the hitch assembly without impediment or danger. A further need exists for a portable tool usable to install flexible members around a fence post.

Embodiments of a multi-functional combination tool, usable within the scope of the present disclosure as described herein, address these and others needs.

SUMMARY OF THE DISCLOSURE

Embodiments disclosed herein relate to a combination tool usable to couple two movable objects, such as a motorized vehicle and a towable vehicle, together. The tool may include a main body having two ends, a first end of which includes a protrusion, such as a ball hitch, configured to mate with a corresponding receptacle of a movable object. The second end may be configured for attachment to another movable object, such as through engagement with a receiver hitch of a vehicle. The first end of the tool may be configured for impacting a post, thereby enabling use of the tool as a post driver. For example, the first end of the tool may include a solid portion disposed therein, while the second end of the tool may include a cavity for receiving a post. A restrainer pin, detachably connected to the main body of the tool, is usable to couple the tool to a movable object, such as by insertion through aligned orifices or openings within the body of the tool and receiver hitch of a vehicle. The restrainer pin may include a first portion disposed at an angle relative to a second portion. One or both portions of the restrainer pin may include orifice(s) for receiving cotter pins, locks or similar securing members. Additionally, in an embodiment, a portion of the restrainer pin can include a notch or similar opening for receiving a flexible member, such that the restrainer pin may be used to torque or otherwise install the flexible member around the post. Additionally, the first end of the tool may include a platform or similar generally flat member, usable to support a user's weight when standing thereon. The platform may further have one or more orifices disposed therethrough, usable as handles when manipulating the tool to impact a post.

Embodiments disclosed herein also provide a method of forming a fence that includes the steps of decoupling a combination tool from a vehicle, the combination tool having a main body comprising an axis, a first end, and a second end, wherein the first end is configured for impacting a fence post, and the second end is configured for coupling the tool to the vehicle. The combination tool may also include a restrainer pin detachably connected to the main body, the restrainer pin further comprising a first portion and a second portion disposed at an angle relative to the first portion, wherein the first portion is configured to engage an end of a flexible member. Other steps of the method include driving a fence post into the ground by impacting the fence post with the first end, and using the restrainer pin to wrap a fence clip around the fence post.

Further embodiments disclosed provide a combination tool useable to form a barrier that includes a main body having a first end and a second end, with the first end configured to removably attach to a first movable object, and the second end configured to removably attach to a second movable object. There is an orifice proximate to the first end, such that the orifice is configured to receive a restrainer pin detachably connected to the elongated body. The restrainer pin may include a notch adapted to receive an end of a flexible member, such that movement of the restrainer pin may coincide with movement of the flexible member that is received within the notch. The tool also includes a solid portion proximate to the second end configured for impacting a barrier post.

Further objects, features, and advantages of the present disclosure will be apparent to those skilled in the art upon examining the accompanying drawings and upon reading the following description of the embodiments described herein.

BRIEF DESCRIPTION OF THE DRAWINGS

FIG. 3A depicts a cross-sectional view of a combination tool engaged with a post, in accordance with embodiments usable within the scope of the present disclosure.

FIGS. 3B-3C depict opposing end views of the combination tool of FIG. 3A.

FIGS. 4A-4B depict a side views of a combination tool usable to form a barrier, in accordance with embodiments usable within the scope of the present disclosure.

DESCRIPTION OF DISCLOSED EMBODIMENTS

Figure 1A:
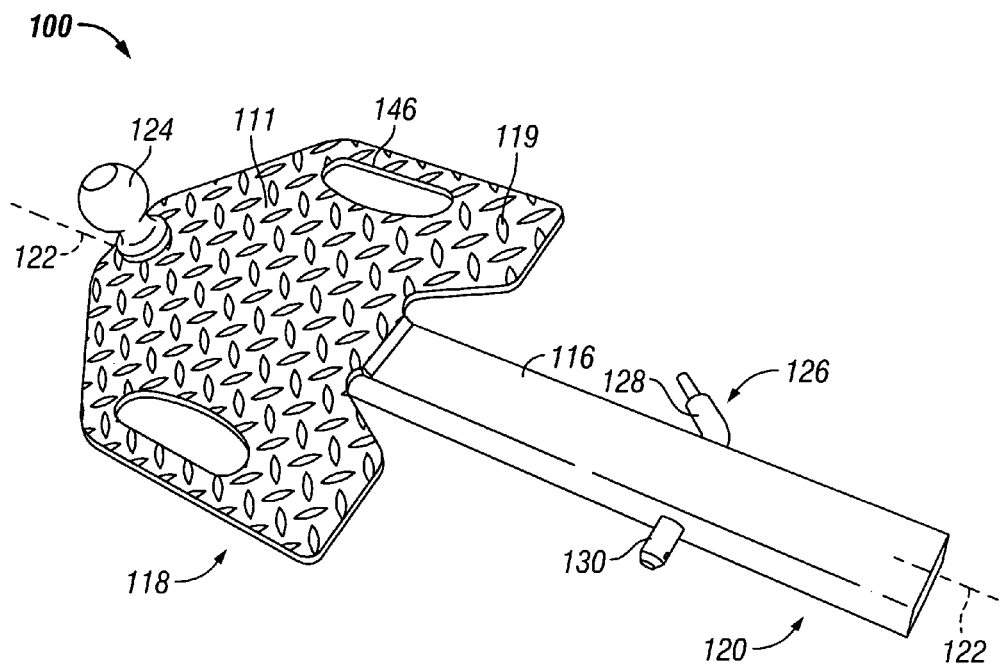
FIGS. 1A-1B depict a top perspective view and a side view, respectively, of a combination tool usable within the scope of the present disclosure.

Embodiments of the present disclosure will now be described in detail with reference to the accompanying Figures, which may include like elements in various Figures denoted by like reference numerals for consistency. The detailed description may also set forth numerous specific details in order to provide a more thorough understanding of the claimed subject matter. However, it should be apparent to one of ordinary skill in the art that the embodiments described may be practiced without these specific details. In other instances, well-known features have not been described in detail to avoid unnecessarily complicating the description.

Figure 1B:
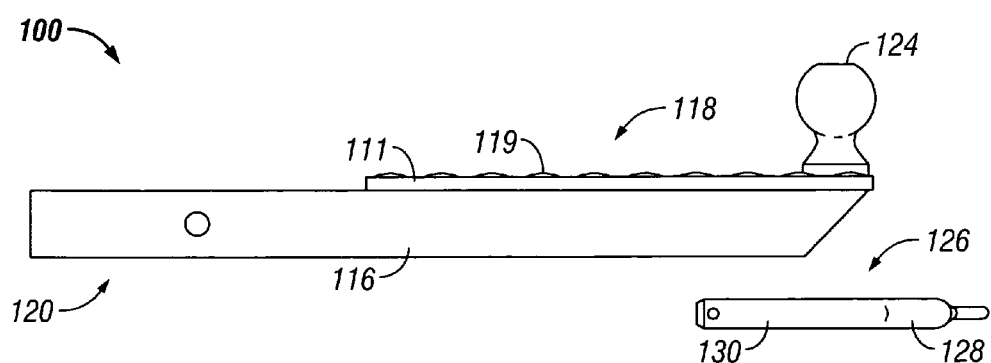

Referring now to FIGS. 1A and 1B, a combination tool usable for coupling movable objects and building a barrier according to embodiments of the present disclosure, is shown. The combination tool 100 of the disclosure may include various structures and components that provide the combination tool 100 with versatility and multifunctional capability.

The combination tool 100 can be formed from any generally durable material, such as steel, usable to couple vehicles and similar objects, and can be manufactured using any methods or techniques known in the art. For example, the combination tool 100 can formed from multiple steel parts that are welded together; however, other means of construction and/or attachment, including formation of the combination tool 100 as a single integral body, are also usable. It should be understood that the materials of construction and the method by which the tool 100 is manufactured is not meant to be limited, and that the combination tool 100 and any components thereof could be made of other materials, such as other hardened metals, aluminum, composites, etc., formed integrally or separately.

The combination tool 100 can include a main body 116 having a first end 118 and a second end 120. A protrusion 124 is shown proximate to the first end 118, the protrusion 124 being configured to mate with a corresponding receptacle (not shown). Specifically, the protrusion 124 is shown as a ball hitch configured to mate with a corresponding socket and/or receptacle within a vehicle.

A platform 111 is shown coupled to the main body 116 beneath the protrusion 124. In an embodiment, the platform 111 can be formed with sufficient thickness and/or materials to support the weight of a user or one or more objects placed thereon. While the manner in which the protrusion 124 is connected to the main body 116 may vary, FIG. 1B shows the protrusion 124 secured to both the platform 111 and the main body 116 through use of a bolt. In other embodiments, the protrusion 124 could be threaded, welded, or otherwise connected directly to the main body 116, or to the platform 111. In a further embodiment, the protrusion 124 can be removably attached to the main body 116, or omitted from the combination tool 100, which may reduce obstruction near the rear of a vehicle.

As described above, the platform 111 can be usable as a step or other form of stabilization device, such as where a person may stand, rest tools, etc. In one example, when the combination tool 100 is coupled between vehicles or other movable objects (not shown), a user may step on the platform 111 to obtain an unobstructed view of the surroundings and/or a view inside or over one or more portions of a vehicle. Thus, the platform 111 is usable to access vehicles or other movable objects and/or navigating between coupled objects. To prevent accidental slippage, the platform 111 can include a surface 119 adapted to provide improved traction and/or friction. For example, the platform 111 can be textured or coated with a pattern, coating, or substance to provide a non-slip surface.

FIGS. 1A and 1B further depict a restrainer pin 126, which may be configured for insertion in an orifice or opening 131 disposed within the main body 116. The restrainer pin 126 may be used, for example, to secure the tool 100 to a movable object (e.g., trailer hitch of a vehicle). Thus, the second end 120 of the main body 116 can be inserted into a receiver hitch of a vehicle such that the orifice 131 of the second end 120 may align with a corresponding orifice (not shown) within the receiver hitch. Insertion of the restrainer pin 126 may thereby connectively secure the tool 100 to the vehicle. The restrainer pin 126 is shown having two arms 128, 130, disposed at an angle relative to one another, such as 45 degrees. A first of the arms 130 is thereby insertable through the main body 116, while the second arm 128 prevents removal of the restrainer pin 126 from the main body 116 in a first direction. The first of the arms 130 can include any manner of hole or similar orifice for accommodating a cotter pin, lock, or similar securing member to prevent disengagement of the restrainer pin 126 in a second direction.

FIGS. 1A and 1B further depict slots 146 within the platform 111, which may be used as handles to facilitate use of the combination tool 100 to drive or otherwise impact fence posts and similar members. The slots 146 may be configured in such a manner, such as, for example, shoulder width apart, so that the combination tool 100 may be provided with a comfortable and/or ergonomic feel. In addition, safety chains (not shown) or the like may be coupled between movable objects and the tool 100, and may include insertion through the slots 146, such that the slots 146 may provide additional and/or synergistic benefits. Safety chains are useful for redundancy and back-up in case primary coupling features fail.

The main body 116 can be generally hollow proximate to the second end 120, such that the tool 100 can be placed over a post, the post being generally aligned with the axis 122 of the main body 116. The first end 116 can include a generally solid portion within, or can otherwise be adapted for impacting the post, such that a user can repeatedly raise and lower the tool 100 using the slots 146, as needed, to drive and/or impact a post.

Figure 2A:
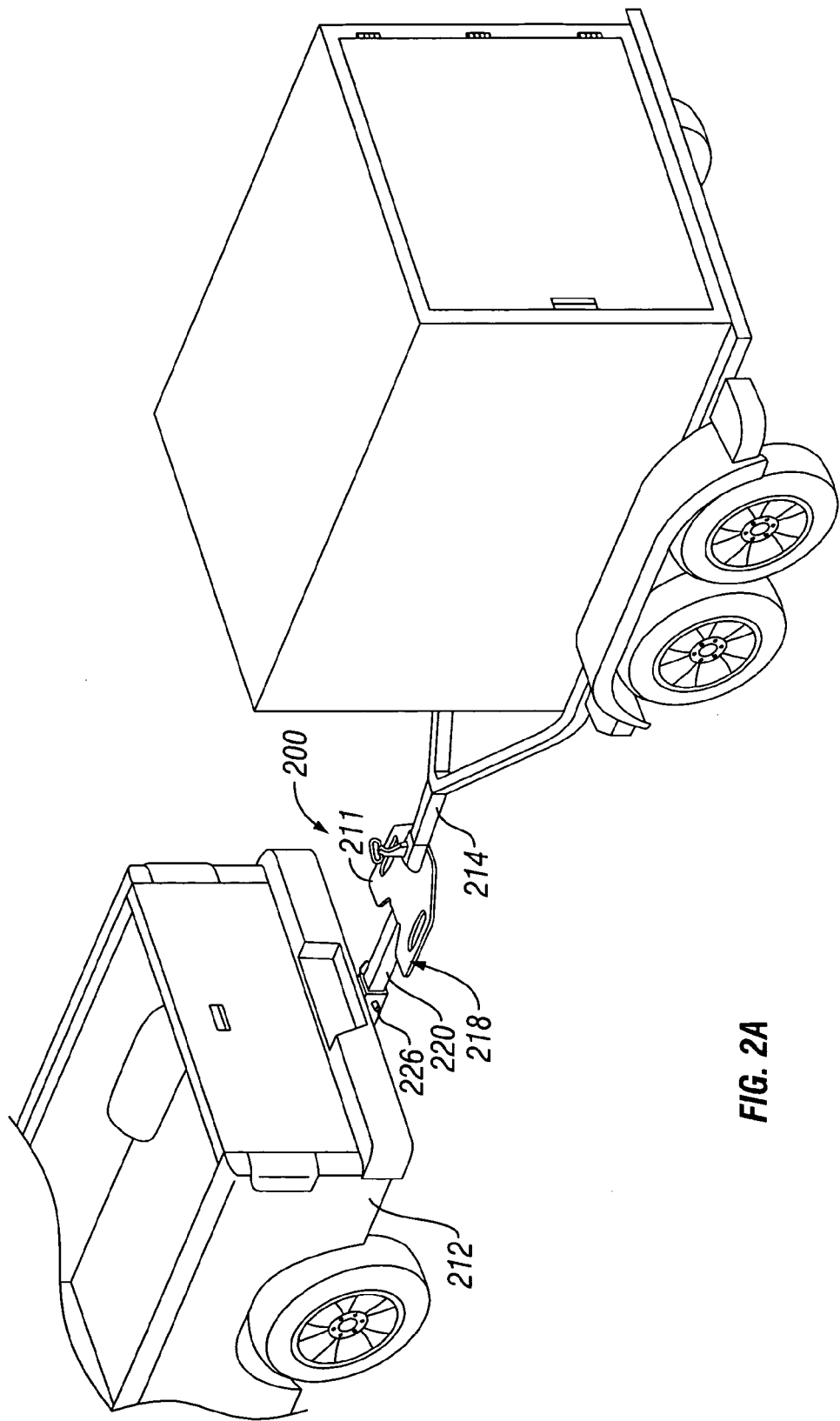
FIGS. 2A-2B depict side views of a combination tool coupled between two movable objects, in accordance with embodiments usable within the scope of the present disclosure.
Figure 2B:
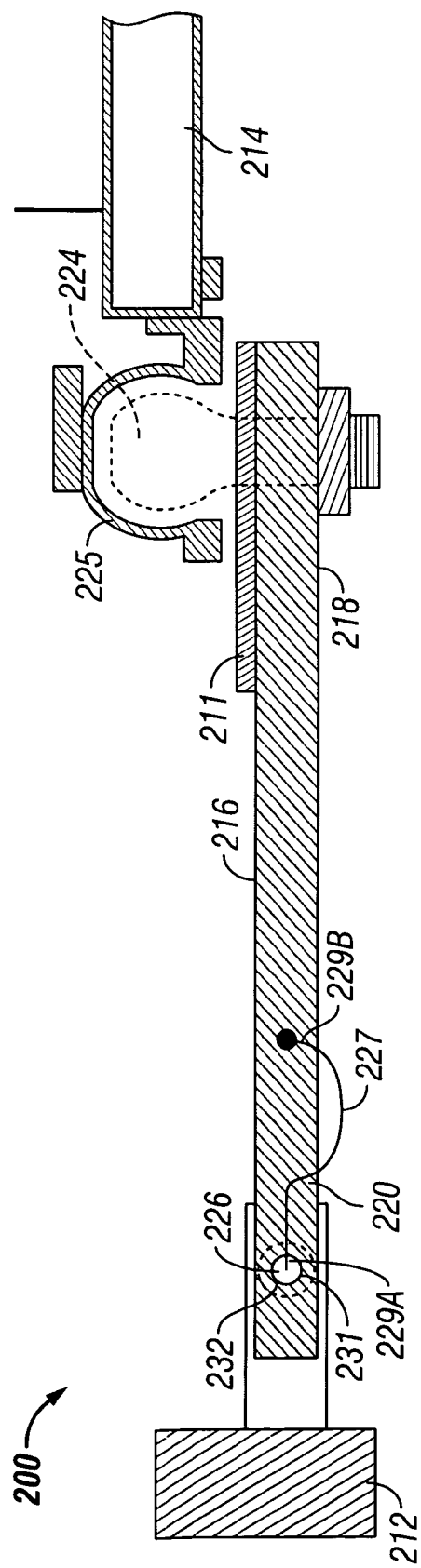

Referring to FIGS. 2A and 2B, views of another embodiment of a combination tool 200 are shown coupled between two movable objects 212, 214. Specifically, FIGS. 2A and 2B depict the movable objects 212, 214 as a truck and a trailer, respectively.

The depicted combination tool 200 is of similar construction to that shown in FIGS. 1A and 1B, the tool 200 having a main body 216 with a first end 218 and a second end 220. The first end 218 can have a platform 211 and a protrusion 224 disposed thereon. The protrusion 224 is shown received within a corresponding receptacle 225 of the second movable object 214. The length of the main body 216 can be selected to provide adequate clearance between the movable objects 212, 214, such as when executing a turn.

A restrainer pin 226 can be detachably connected to the main body 216, and may be used to secure the tool 200 to the first movable object 212. As shown, the restrainer pin 226 may be detachably connected to an end 229A of a chain 227, while an opposing end 229B of the chain is riveted or otherwise secured to the main body 216. However, it should be understood that the restrainer pin 226 can simply be inserted through an orifice within the main body 216, and that use of a chain or similar securing member can be omitted. The first movable object 212 can have at least one orifice or opening 232 that may be aligned with the opening 231 within the main body 216, such that the combination tool 200 may be connected to the first movable object 212. Specifically, the alignment of these openings 231 and 232 may permit insertion of the restrainer pin 226 therethrough, thereby forming a secured connection between the combination tool 200 and the first movable object 212.

FIGS. 5A, 5B, 5C, and 5D, depict views of an embodiment of the restrainer pin 226. FIGS. 5A-5D together show the restrainer pin 226 may have a first portion 228, and a second portion 230 bent at an angle α relative to the first portion 228. In an embodiment, the angle may be approximately 45 degrees. This configuration may permit the second portion 230 to be inserted through an opening (231, FIG. 2B) within the main body (216, FIG. 2B) of the tool 200, while the first portion 228 prevents removal of the restrainer pin 226 in a first direction. The restrainer pin 226 may be constructed of a strong, durable material capable of withstanding significant loads and/or stresses as a result of towing. For example, the second portion 230 may be provided with dimensions and/or materials sufficient to withstand a towed weight ranging from 10,000 to 50,000 pounds.

The second portion 230 can include a proximate end 238 and a distal end 240, where the proximate end 238 may be adjacent to the first portion 228. In one embodiment, the distal end 240 may be configured to maintain the connection between the restrainer pin 226, the main body 216, and the first movable object 212. For example, a cotter pin, a lock, or a similar securing member can be inserted into a hole 242 extending through the distal end 240 to prevent removal of the restrainer pin in a direction opposite the first portion 228.

The restrainer pin 226 is further shown including a notch 244 or similar orifice in the first portion 228, which is usable to engage a flexible member (not shown), such as a fence clip. The depth of the notch 244 or orifice can be sufficient to allow snug but removable insertion of the flexible member within the restrainer pin 226. The second portion 230 may be configured to provide a comfortable and/or ergonomic feel to a user when the restrainer pin 226 is used to move flexible members, such as around fence posts.

Referring now to FIGS. 3A, 3B, and 3C, views of a combination tool 300 in use impacting and/or driving a post 354 are shown. The depicted combination tool 300 can be of similar construction to the tool shown in FIGS. 1A, 1B, 2A, and 2B, having a main body 316 with a longitudinal axis 322, a first end 318, and a second end 320. The first end 318 can be configured to removably attach to a first movable object (not shown), and the second end can 320 be configured to removably attach to a second movable object (not shown), as previously described.

As shown, the combination tool 300 can be used to impact and/or drive any elongated shaft into the ground, including, but not limited to, anchors, piping, grounding rods, round fencing, and t-post fencing. As such, the first end 318 of the tool 300 can be configured for impacting a post 354 or similar structure. In one embodiment, the first end 318 can include a solid portion 356 disposed therein that may be used to impact the post 354. The second end 320 can include a cavity 334 that may be used to receive the post 354. The combination tool 300 may include at least one slot 346, which in combination with a portion 311A of the platform 311 may be used to facilitate manipulation of the tool 300, such as when it is desired to impact the post 354. In one embodiment, one or more slots 346 can be disposed in the platform 311.

Specifically, the second end 320 can generally include a hollow cylindrical, square, rectangular, etc. tubular portion that forms a cavity 334, which may be used to receive an elongate object. FIGS. 3A-3C illustrate the second end 320 placed over an end of the post 354, such that the post 354 may freely slide into the cavity 334, whereby the solid portion 356 within the first end 318 may contact the top end 355 of the post 354.

Accordingly, the combination tool 300 may be placed over the post 354 so that the post extends into the tool 300. In driving post(s) 354, a user may grasp slots 346 and portions 311A, and repeatedly raise and lower the tool 300 in order to impact the top end 355 of the post 354. The impact force may translate through the post 354, thereby driving the post 354 into the surface S. The presence of slots 346 may facilitate the user's ability to grasp and/or operate the combination tool 300.

In an embodiment, the post 354 can have a length of about eight feet, and a width ranging from 0.5 inches to 2 inches. For example, a post 354 having a length of about eight feet can be driven two feet into the surface S, such that the remainder of the post 354 above the surface S can be used to support a fence that has a height of about six feet. However, it should be understood that embodiments of the combination tool 300 are usable to drive posts or similar members having any dimensions.

Figure 4B:
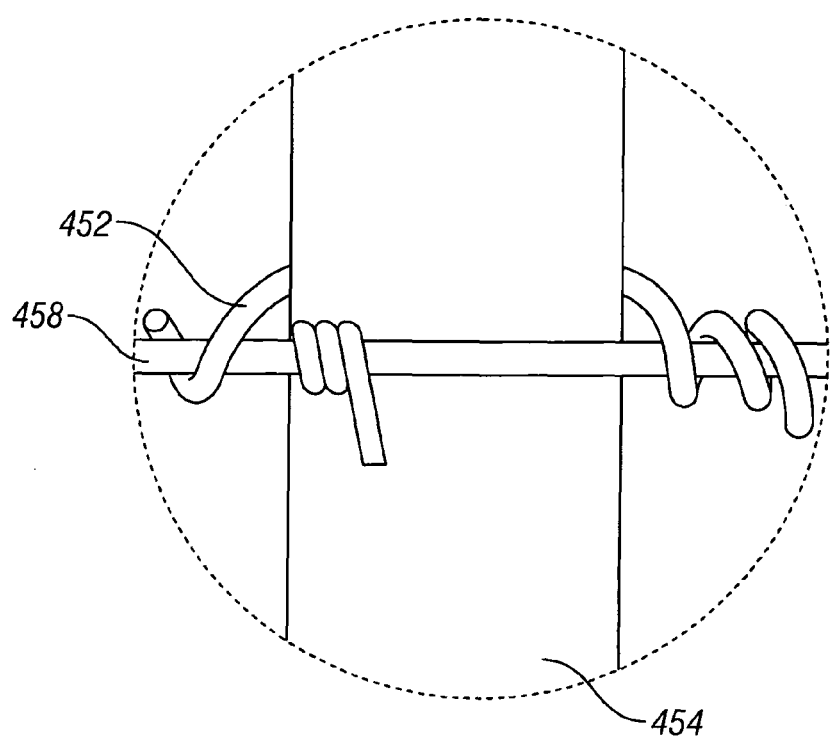
Figure 5A:
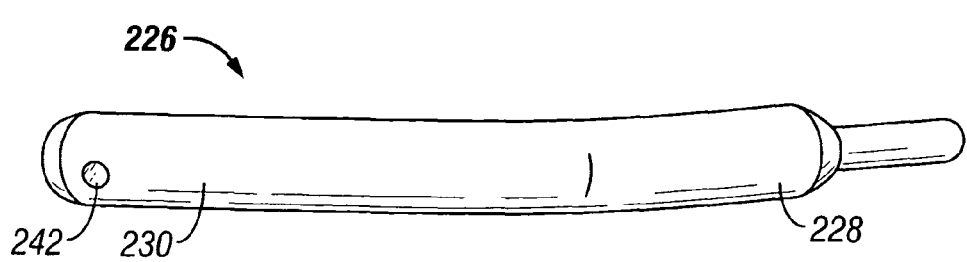
FIGS. 5A-5D depict multiple views of detachable restrainer pin usable for coupling movable objects and working flexible members, in accordance with embodiments usable within the scope of the present disclosure.
Figure 5B:
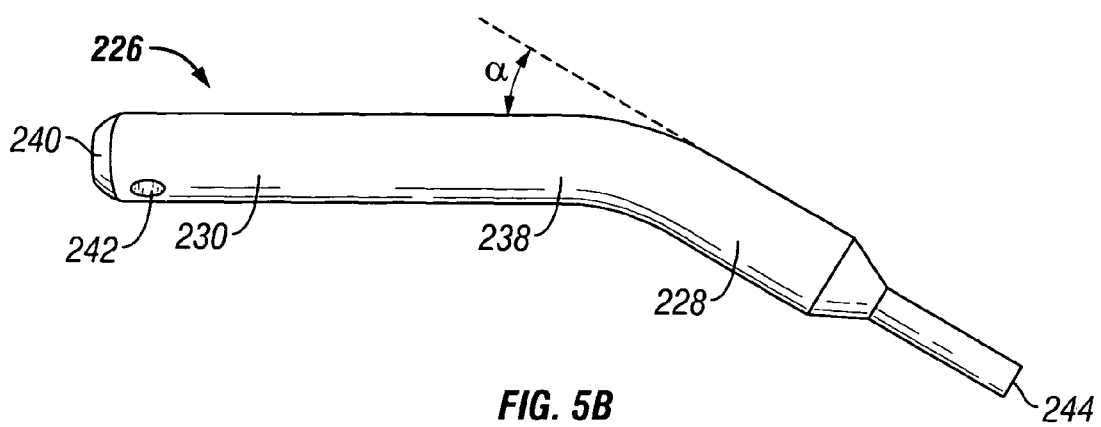
Figure 5C:
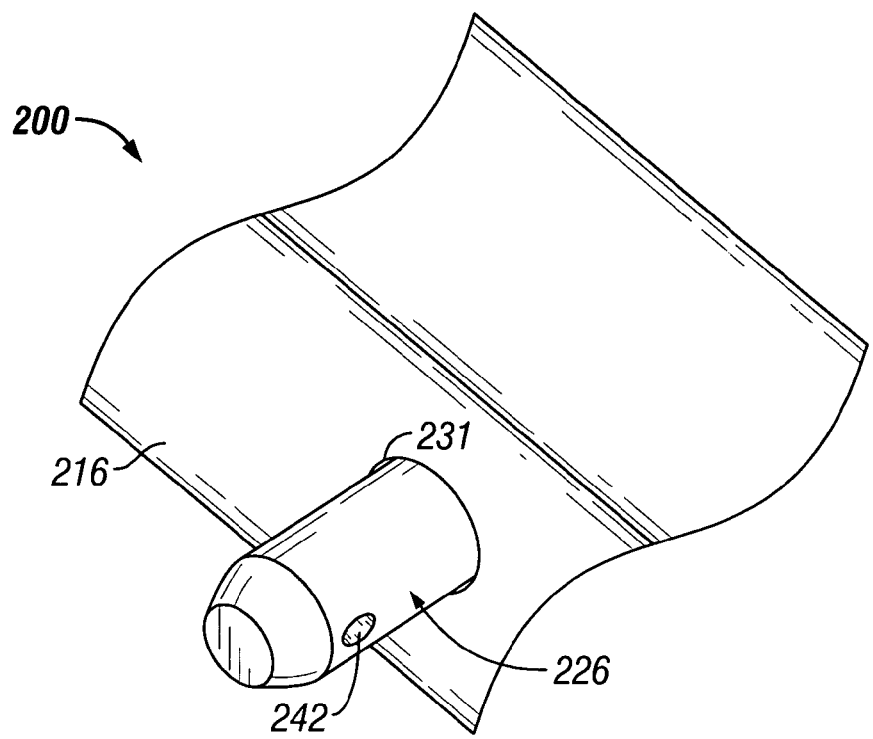
Figure 5D:
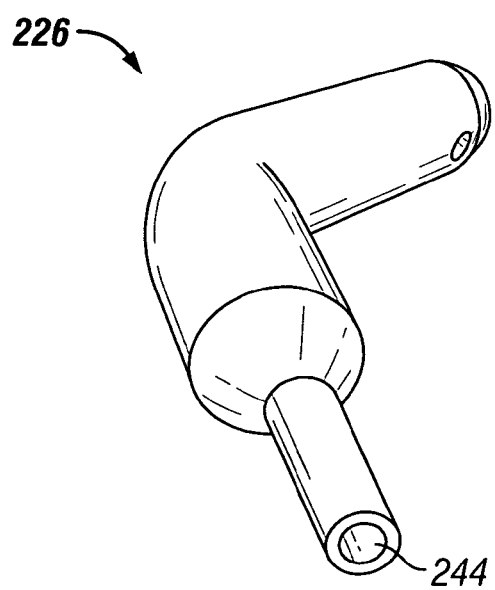

Referring now to FIGS. 4A and 4B, views of a barrier and a combination tool usable to form the barrier are shown. Once posts 454 are driven into the surface S, a flexible member (i.e., clip, mounting clip, t-post clip, mounting wire, wire, etc.) 452 may be connected to the posts 454 to couple a wire 458 thereto. The clip or other flexible member 452 may be formed from a single piece of wire or other ductile metal or similar material, and may include a first end 452A and a second end 452B. The restrainer pin 426 may be used to torque or otherwise provide one or more bends to the flexible member 452 as may be needed to couple wire 458 to the post 454 in order to form a portion of a wire fence barrier 475.

Multiple fence wires 458 can be extended between posts, and multiple flexible members can be used to couple the wires 458 to the posts 454, as needed. To perform the securing operation, either end of the flexible member 452 may be inserted into the notch (244, FIG. 5B) or other orifice of the restrainer pin 426, and the restrainer pin 426 may be accordingly moved (i.e., rotated, twisted, maneuvered, etc.) to wrap the flexible member 452 around the wire 458 and/or the post 454.

To use the restrainer pin 426, the end of the flexible member 452B can be inserted into the notch (244, FIG. 5B) that may be disposed in the first portion 428 of the restrainer pin 426. The handle portion 430 is then grasped by a user, and may be maneuvered, twisted, etc. so that the flexible member 452 may be tightened around wire 458, to thereby secure the wire 458 to the post 454.

It should be noted that the restrainer pin 426 is not limited to use with the flexible member 452, and as such the restrainer pin 426 may advantageously be used for other purposes, such as engaging and/or stretching wire 458, or other uses as known in the art. Additionally, the restrainer pin 426 can be used to remove the flexible member 452 may be removed from the post 454, such as when erecting and removing temporary barriers.

The combination tool may be used to form a barrier by way of use in a number of various steps. Embodiments of the present disclosure may provide methods of forming a fence that includes the step of decoupling a combination tool from a motorized vehicle. The combination tool may include various components, as described previously, such as a main body with an axis, a first end, and a second end. The first end can be configured for impacting a post, and the second end can be configured for coupling the combination tool to the motorized vehicle.

The combination tool can include an opening proximate to the first end, such that the opening may be readily configured to receive a restrainer pin detachably connected to the main body. The restrainer pin can include a first portion and a second portion disposed at an angle relative to the first portion, the first portion being configured to engage an end of a flexible member.

The restrainer pin can have a notch adapted to receive an end of a flexible member, and the restrainer pin can be configured to manipulate the flexible member. The notch may be configured to torque the flexible member around a post. In one embodiment, the first portion may receive the end of a piece of wire or clip in such a manner that the restrainer pin may be used to wrap the wire or clip around a post, another piece of wire, etc.

Other steps of the method may include driving the post into the ground by impacting the post with the first end, and using the restrainer pin to wrap the flexible member around the post.

In one embodiment, the flexible member can be a fence clip. The method can further include the steps of driving a second post into the ground by impacting the second post at least once with the first end, coupling a wire between the first flexible member and the second flexible member, and using the restrainer pin to wrap a second flexible member around the second post.

When a user is finished using the combination tool to work on the barrier, the method may include recoupling the combination tool to the motorized vehicle, and/or coupling the combination tool to another movable object.

While the present disclosure has been described with respect to a limited number of embodiments, those skilled in the art having benefit of the present disclosure will appreciate that other embodiments may be devised which do not depart from the scope of the disclosure described herein. Accordingly, the scope of the disclosure should be limited only by the claims appended hereto.

What is claimed:

1. A combination tool useable to form a fence, the tool comprising:
   a main body having a first end and a second end, wherein the main body comprises an orifice extending laterally therethrough, wherein the first end of the main body is configured to removably attach to a first movable object, and the second end of the main body is configured to removably attach to a second movable object;
   a restrainer pin configured for insertion into the orifice, wherein the restrainer pin has a longitudinal opening at a first end of the restrainer pin, wherein the longitudinal opening extends longitudinally through at least a portion of the restrainer pin, wherein the longitudinal opening is adapted to receive an end of a flexible member so that movement of the restrainer pin while the flexible member is received therein moves the flexible member.

2. The combination tool of claim 1, wherein the main body comprises a cavity extending longitudinally from the second end of the main body, wherein the cavity is configured for receiving a fence post, wherein the cavity terminates with a solid portion for impacting the fence post.

3. The combination tool of claim 2, further comprising a platform disposed on the first end of the main body.

4. The combination tool of claim 3, wherein the platform comprises at least two grasping elements configured to facilitate manipulation of the combination tool with hands to impact the fence post, wherein the at least two grasping elements are located on opposite sides of the platform.

5. The combination tool of claim 3, wherein the platform comprises at least two slots configured to facilitate manipulation of the combination tool with hands to impact the fence post, wherein the at least two slots are located on opposite sides of the platform.

6. The combination tool of claim 1, wherein the restrainer pin is configured for insertion into the orifice to extend through the main body substantially perpendicular to a longitudinal axis of the main body.

7. The combination tool of claim 1, wherein at least a portion of the restrainer pin adjacent to the first end of the restrainer pin comprises an outer diameter that is smaller than a second outer diameter adjacent to a second end of the restrainer pin.

8. The combination tool of claim 1, wherein the first movable object, the second movable object, or combinations thereof comprise a land vehicle.

9. The combination tool of claim 1, wherein the restrainer pin further comprises a first segment and a second segment disposed at an angle relative to the first segment.

10. The combination tool of claim 9, wherein the restrainer pin further comprises a lateral opening for receiving a securing member to maintain a connection between the restrainer pin and the main body.

11. A restrainer pin usable to form a fence, the restrainer pin comprising:
- an elongated body, having a first segment and a second segment,
- wherein the first segment comprises a bore extending longitudinally through at least a portion of the first segment, wherein the bore is configured to engage an end of a flexible member; and
- wherein the second segment is disposed at an angle relative to the first segment, wherein the second segment has a thickness sufficient to provide coupling between a hitch and a vehicle.

12. The restrainer pin of claim 11, wherein at least a portion the of first segment comprises an outer diameter that is smaller than the outer diameter of the second segment.

13. The restrainer pin of claim 12, wherein the first segment comprises a first end of the elongated body and the second segment comprises a second end of the elongated body, wherein the bore extends longitudinally through the first end of the elongated body and through at least a portion of the first segment.

* * * * *